3,006,069
METHOD OF SEALING A METAL MEMBER TO A CERAMIC MEMBER

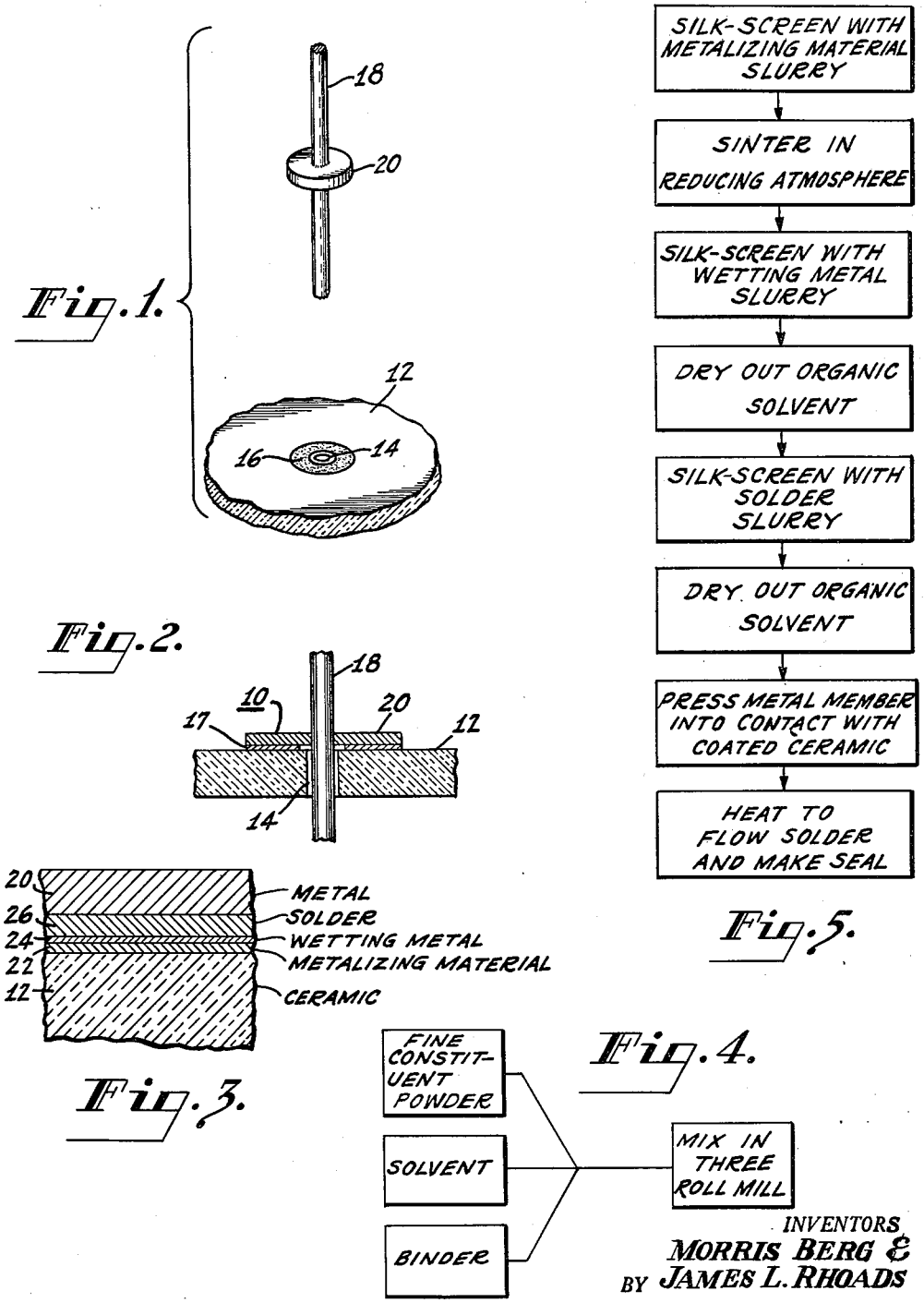

James L. Rhoads and Morris Berg, Lancaster, Pa., assignors to Radio Corporation of America, a corporation of Delaware
Filed May 23, 1957, Ser. No. 661,061
6 Claims. (Cl. 29—473.1)

This invention relates to the bonding of metal to ceramic and, because of certain of its special features, is particularly useful in making ceramic-to-metal seals in the manufacture of electron tubes. As such, our invention teaches, in addition to a novel method of sealing together metal and ceramic members, a novel design of seal for sealing rigid lead-in conductors through apertures of a ceramic member.

With the advent of ceramics in electron tube construction, much work has been done in an attempt to provide satisfactory ceramic-to-metal seals, both from the standpoint of seal strength and from the standpoint of ease of fabrication and uniformity. In making ceramic-to-metal seals it has been known to first provide an adherent metalized coating to the ceramic and then either braze or solder a metal piece thereto. In the latter case, since the metalized coating is usually a refractory material not easily wet by solder, it is also know to apply a layer of some suitable metal to the metalized coating to promote wetting by the solder. However, the sealing methods of the prior art have not provided the close control necessary to give uniform results so that work pieces could later be placed in automatic production line equipment. This lack of uniformity, by necessity, also results in lower quality seals than could be made if all steps, materials, and applications thereof were of a uniform nature. Neither of the prior art methods of brush painting or rolling provides the close control, smoothness, or uniformity which is so essential to high quality, low shrinkage production. Moreover, the prior art has not taught the specific treatment of the various materials and applications thereof which we have found to give unexpected strength in ceramic-to-metal seals.

It is therefore an object of our invention to provide an improved method of seal fabrication which results in a stronger, more reliable seal than those known in the prior art.

Another object of our invention is the provision of a novel method of seal fabrication whereby close control of the application of the seal-making materials is possible thereby resulting in production uniformity.

A further object is the adaptation of metalizing and sealing operations to production line methods.

According to our invention, we silk screen onto the ceramic member, in a desired pattern, contiguous adherent layers of a refractory metalizing material not easily wet by solder, such as Mo, W, Mo-Mn, W-Fe, Mo-Cu, and MoO$_3$, and a metal, such as nickel and copper, which will promote wetting of the metalizing material by solder. The ceramic-to-metal seal can then be completed by soldering the metal member to the metal coated ceramic member. The application of solder may be made by applying a layer of hard solder onto the wetting metal layer either by silk-screen printing or by the use of solder foil. Alternatively, the solder layer can be omitted and the metal member joined to the coated ceramic by known ordinary methods of soldering. It will be understood that the metal member must be of a metal or alloy which is capable of being soldered, for example, copper, iron, nickel, molybdenum, or Kovar which is an alloy having a composition of 17% cobalt, 29% nickel, 0.3% manganese, and the balance iron.

According to our invention, these layers are provided by first preparing separate slurries of each of the seal making materials by mixing a powder of each of them with a solvent and a binder. These slurries are then silk screened in successive layers in the order named onto the ceramic. The metalizing material layer is sintered thereon, while the other two are simply dried at a temperature below the decomposition temperature of the binder, with an infrared heat lamp, for example.

In the prior art, lead-in seals for sealing a metal conductor through an aperture in a ceramic member include the making of a bond between the contiguous surfaces of the conductor and the aperture wall, or the bonding of the face of a flange sealed to the wire with the flat ceramic surface surrounding the aperture. Fabrication of the first of these two types of seals is difficult from the standpoint of providing a suitable preparation of the aperture wall. Fabrication of the second type of seal is difficult since extremely close tolerance application of preparation materials is necessary to avoid seal defects. One feature of our invention resides in an improvement of the latter type seal.

It is, therefore, an additional object of our invention to provide an improved flange-type, ceramic-to-metal seal whose fabrication is adaptable to production-line methods.

In the practice of our invention to provide a superior lead-in seal, according to the flange-type seal technique, the seal making materials are laid down by silk-screening onto the ceramic member in a ring-like area around the lead-receiving aperture such that the inside diameter of the ring is slightly larger than the aperture diameter.

Our invention will be hereinafter explained in greater detail in reference to the accompanying drawings in which:

FIGURE 1 is an exploded, perspective view showing the component parts of a flange type lead-in ceramic-to-metal seal made according to our invention;

FIGURE 2 is a side elevation view in section of the assembled lead-in seal of FIGURE 1;

FIGURE 3 is an enlarged section view showing the constituent layers provided in making a ceramic-to-metal seal according to our invention;

FIGURE 4 is a flow sheet showing the method of preparing the coating mixture slurries; and FIGURE 5 is a processing schedule showing our step-by-step procedure for making a ceramic-to-metal seal.

Referring to FIGURES 1 and 2, a lead-in seal 10 according to our invention is made through a ceramic member 12 having an aperture 14 therethrough. An annular area 16 on the ceramic member 12 surrounding, but removed from, the edge of the aperture 14 is provided with seal-making materials 17 according to our invention, as hereinafter detailed in reference to FIGURES 3, 4, and 5, to enable bonding of a metal piece to the ceramic. A metal wire conductor 18 to be sealed through the ceramic member 12 is joined to a transverse flange 20, which may be either integral with the conductor 18 or in the form of a separate washer hermetically sealed to the conductor as by welding, soldering or brazing. The conductor 18 is disposed through the aperture 14 so that the flange 20 flatly abuts the prepared surface area 16. A braze or hard solder bond then made between the surface area 16 and the flange 20 provides a vacuum-tight seal of the conductor 18 through the ceramic member 12.

In making a flange-type lead-in seal we have discovered that if solder is permitted to seep into the aperture and surround the lead-in conductor, subsequent temperature changes may cause the seal to fracture and the metal member to separate from the ceramic. To avoid this we have found that by preventing the apertured wall or the area adjacent thereto from being metalized, the solder can be prevented from seeping therein since the solder will not wet the bare ceramic. For this reason, it is the novel ring-like shape seal area which makes possible a strong seal not quickly susceptible to subsequent fracturing and which forms a feature of our invention.

In reference to FIGURES 3, 4, and 5 the fabrication of the novel seal according to FIGURES 1 and 2 is made by laying down onto the ceramic member 12, by silk-screening, successive contiguous layers of a metalizing material 22, preferably molybdenum; a wetting metal 24, preferably nickel; and a hard solder 26. This is done by preparing three separate slurries, one each containing the powder of one of the three named contiguous layers. For example, in providing a metalizing material layer 2, a printable slurry is preferably prepared as set forth in FIGURE 4. The metalizing material is provided in finely powdered form preferably having a particle size less than 50 microns. The finer the powder the better the seal results which can be expected. This powder is combined with a solvent and a binder and mixed, for example, in a three-roll mill, to form a slurry having the consistency of a printer's ink. In the same manner, slurries of the wetting metal and the solder are prepared from a powdered wetting metal and a powdered solder, respectively.

To seal a metal member to a ceramic member, the three slurries, prepared according to the method of FIGURE 4, are applied successively to the ceramic member as set forth by the processing schedule of FIGURE 5.

First, the ceramic member is prepared for coating by cleaning one of the surfaces thereof. This is preferably done by ultrasonic cleaning using a detergent in water. The metalizing material slurry is then applied to desired portions of that surface by known silk screen printing techniques. The coated ceramic is then fired in a reducing atmosphere to evaporate the solvent and decompose the binder from the coating slurry and to sinter the metalizing material to the ceramic. Next, the wetting metal slurry is silk-screen printed onto the sintered metalized surface. The organic solvent in this slurry is then dried out at a temperature substantially below the sintering temperature of the wetting metal and below the decomposition temperature of the binder. A dried layer of wetting metal is thus maintained coherent by the binder contiguous with and upon the sintered metalized surface. The solder slurry is then silk screen printed onto the wetting metal layer and likewise dried, but at a temperature substantially below the melting point of the solder and below the decomposition temperature of the binder. Thus, the organic solvent of this slurry is driven off leaving a dried layer of solder and binder contiguous with and upon the first two coating layers. There is thus provided a ceramic member having successive contiguous layers thereon of a metalizing material, a wetting metal in a binder, and solder in a binder. To complete the seal, a clean surface of the metal member is pressed into contact with the triple-coated area of the ceramic; and the assembly is heated to a temperature sufficient to cause the solder to flow and to alloy with the wetting metal. The wetting metal-solder alloy in turn wets the sintered metalized surface and adheres thereto, thus bonding the metal member to the ceramic member. Since the melting temperature of the solder is above the decomposition temperatures of the binders for the wetting material and solder, these binders are evaporated during this last step in making the seal. In applying the method set forth above to the manufacture of the seal design according to FIGURES 1 and 2, all three layers, and especially the metalizing layer, are restricted to a ring-like area spaced from the aperture; and hence, solder seepage into the aperture and around the lead is prevented. As hereinbefore mentioned, the likelihood of seal fracturing is thus greatly reduced or eliminated.

In a preferred manner of practicing our invention the metalizing material slurry is prepared by suspending 130 grams of a fine molybdenum powder, up to 5 micron particle size, in 100 cc. of ethylene glycol di-n-butyl ether as a solvent, and 9.1 grams of ethyl cellulose as a binder. This suspension is thoroughly mixed in a three roll mill by subjecting it to five passes through the rollers with successively increasing roller pressures of 0, 50, 100, 300, and 500 pounds. The suspension is then thinned to a printer's ink consistency slurry by adding an additional 100 cc. of ethylene glycol di-n-butyl ether. The slurry is then coated onto a high (90–100%) alumina ceramic by printing through a fine mesh silk screen, and the coated ceramic then thoroughly dried in air using an infrared heat lamp. The coated ceramic is then fired at about 1450° C. in a commercial forming gas atmosphere. Drying before the sintering is done to prevent blistering during sintering. In order to produce an extremely uniform layer, the molybdenum slurry is preferably printed through a 165 mesh screen. In this case only a half desired thickness metalized coating is applied. Hence, it is necessary to repeat the above application of the metalizing slurry and firing schedule. The sintered metalized coating can be laid down in one step by using a larger mesh screen, e.g. 60 mesh, but a more uniform layer can be provided by the two-step method.

A wetting metal slurry is prepared using proportions and procedures identical to those used in preparing the metalizing slurry except that 130 grams of nickel powder are used instead of the 130 grams of molybdenum. This nickel slurry is laid down upon the sintered metalized coating layer, but unlike the double metalized coating, only a single application is made, this also preferably through a 165 mesh screen. Instead of drying and then sintering, the nickel layer is simply dried, again using an infrared heat lamp.

Finally, a plurality of layers of solder are applied to the nickel layer by preparing a solder slurry in somewhat similar manner. Here, 100 grams of "BT" silver solder powder, up to 50 micron size, are mixed with 60 cc. of the ethylene glycol di-n-butyl ether as a solvent, and two grams of the ethyl cellulose as a binder. This mixture is processed in a three roll mill in the same manner as was the metalizing slurry and is then thinned with an additional 80 cc. of the ethylene glycol di-n-butyl ether. In order to provide a sufficient amount of solder, this solder slurry is laid down upon the nickel in a plurality of layers, each layer being separately dried out by a heat lamp before applying the succeeding layer.

The metal member and coated ceramic member are then pressed together and the entire assembly heated to about 800° C. to evaporate the two binders and cause the solder to flow and bond the metal member to the ceramic member as described above.

Choice of materials should not be considered as a limitation to the scope of our invention. For example, the metalizing material powder may be any one of a number of recognized materials known to the prior art. Such materials usually consist in whole, or at least in their major ingredient, of a refractory metal. Examples of known metalizing materials which can be used to practice our invention are Mo, W, Mo-Mn, W-Fe, Mo-Cu, and $MoO_3$.

Since it is found that a hard solder will not readily wet these refractory materials, it is necessary that the intermediate wetting metal layer be used to promote wetting. Here, any metal is suitable which will alloy easily with the chosen solder and yet will wet the sintered metalized layer. Nickel and copper are two examples of common metals suitable for this purpose.

A wide choice of solders suitable for practicing our invention is available. However, in the manufacture of electron tubes it is preferred to use a hard solder in order to better resist high bake-out temperatures. Within the group of hard solders are numerous suitable commercial types such as BT silver solder, Nicoro (an alloy of 35% gold, 62% copper, and 3% nickel), Nioro (an alloy of 82.5% gold, and 17.5% nickel), copper, silver, and gold.

The solvent used serves simply to provide a medium for producing a suspension with the various powders. As such, it need only be easily evaporable and not harmfully reactive with the powder used. Suitable organic solvents include ethylene glycol di-n-butyl ether and amyl acetate. Ordinary water might also be used.

The binder is used to provide an adherent vehicle for the powder after the solvent is evaporated out of the slurry, and serves to maintain the powder in a cohesive layer. The binder may be any substance possessing these characteristics which will mix with the solvent and yet not be harmfully reactive with the powder or solvent. Among the organic compounds nitrocellulose, as well as the previously mentioned preferred ethyl cellulose, may be used. Inorganic sodium silicate may be used with a water solvent.

Processing of the slurries by use of a conventional three roll mill has been found to provide adequate mixing. However, any suitable substitute mixing method (e.g. ball mill) is acceptable so long as a thorough mixing is obtained. The length of duration of milling depends, of course, upon the type of milling, but generally speaking, the longer the better.

Because of the uniformity obtainable, it is preferred that the silk-screening be performed with a 165 mesh screen. Nevertheless, screens up to 60 mesh are suitable. In any event, it is preferred that a total thickness of 0.001 to 0.002 inch be laid down for the metalizing layer, approximately 0.0005 inch for the nickel layer, and 0.002 to 0.005 inch for the solder layer. In sintering, the metalizing layer may be reduced to half its original thickness.

The firing schedule treatment of the metalizing material slurry is conventional. Its sole purpose is to dry out the slurry and sinter the metalizing material to the ceramic. The temperature used will depend upon the choice of metalizing material used. In most cases, this step is carried out in a reducing atmosphere such as hydrogen or commercial forming gas.

While the metalizing material slurry is sintered to the ceramic, the nickel and solder slurries are preferably not so treated. Instead, only a heating is used which is sufficient to dry out the solvent in these slurries and leave a dry layer of metal powder and binder which can resist much abuse. This drying could be performed at room temperature but, to speed up this step, low heat can be applied so long as the nickel is not raised above its sintering temperature, the solder above its melting point, or the binder in either case above its decomposition temperature.

In addition to the variations available in choice of materials, two major departures from the preferred method of procedure can be made without departing from the spirit of our invention. Although we have found that stronger seals can be obtained by not firing the nickel slurry to a sintering temperature, such firing nevertheless can be done, and, in the case of some available materials, might prove to provide a superior seal. As a second departure, the application of the solder slurry might be omitted altogether. The solder could then be applied at the time of making the seal in any conventional manner, such as melting a rod or wire of solder material, or by use of a sheet of thin foil of solder.

What is claimed is:

1. The method of sealing a metal member to a ceramic member comprising the steps of: silk-screening onto only a predetermined seal area of said ceramic member at least one uniform layer of a first mixture composed of a powdered refractory metalizing material selected from the group consisting of Mo, W, Mo-Mn, Mo-Cu, and MoO$_3$, a solvent, and a binder; firing said ceramic member and layer to evaporate said solvent and binder and sinter said metalizing material; silk-screening onto said sintered first mixture layer at least one uniform layer of a second mixture composed of a powder of a metal selected from the group consisting of nickel and copper and capable of wetting said metalizing material, a solvent, and a binder; drying said second mixture layer; applying onto said second mixture layer at least one uniform layer of a hard solder capable of wetting said metal and said metal member; pressing said metal member into contact with said solder layer; and heating said members and layers to a temperature sufficient to cause said solder layer to flow and seal said members together.

2. The method of claim 1, wherein said second mixture is dried at a temperature below the decomposition temperature of the binder to evaporate the solvent only.

3. The method of sealing a metal member to a ceramic member comprising the steps of: silk-screening onto only a predetermined seal area of said ceramic member at least one uniform layer of a first mixture composed of a powdered refractory metalizing material selected from the group consisting of Mo, W, Mo-Mn, Mo-Cu, and MoO$_3$, a solvent, and a binder; firing said ceramic member and layer to evaporate said solvent and binder and sinter said metalizing material; silk-screening onto said sintered first mixture layer at least one uniform layer of a second mixture composed of a powder of a metal selected from the group consisting of nickel and copper and capable of wetting said metalizing material, a solvent, and a binder; heating said second mixture layer at a temperature below the decomposition temperature of said binder to evaporate said solvent; silk-screening onto said second mixture layer at least one uniform layer of a third mixture composed of a powdered hard solder capable of wetting said metal and said metal member, a solvent, and a binder; heating said third mixture layer at a temperature below the decomposition temperature of said binder to evaporate said solvent; pressing said metal member into contact with said solder layer; and heating said members and layers to a temperature sufficient to evaporate said binders and cause said solder layer to flow and seal said members together.

4. A method of sealing a metal member to a ceramic member comprising the steps of: silk screening onto only a predetermined seal area of said ceramic member a first uniform layer of a first mixture composed of powdered molybdenum, an organic solvent, and an organic binder; firing said ceramic member and layer to evaporate said organic constituents and sinter said molybdenum; silk screening onto said sintered molybdenum a second uniform layer of a second mixture composed of powdered nickel, an organic solvent, and an organic binder; heating said second layer at a temperature below the decomposition temperature of said binder to evaporate said organic solvent and provide a uniform nickel layer on said sintered molybdenum; silk screening onto said nickel layer a third uniform layer of a third mixture composed of a powdered hard solder capable of wetting said nickel layer and said metal member; an organic solvent, and an organic binder; heating said third layer at a temperature below the decomposition temperature of said binder to evaporate said organic solvent from said third mixture and provide a uniform layer of solder on said nickel layer; pressing said metal member into contact with said solder layer and heating said members and said layers to a temperature sufficient to evaporate said binder, to wet said metal member with said solder, to alloy said solder with said nickel, and to wet said sintered molybdenum with said nickel-solder alloy.

5. The method of sealing a flanged metal conductor through an apertured ceramic member comprising the steps of silk-screening a uniform layer of powdered refractory metalizing material selected from the group consisting of Mo, W, Mo-Mn, Mo-Cu, and MoO$_3$ onto the surface of said ceramic only in a planar ring-like area around said aperture, the inside dimension of said area being larger than the diameter of said aperture, sintering said layer, silk-screening a uniform layer of nickel onto said sintered layer, applying a uniform layer of hard solder onto said nickel over said area, disposing said conductor through said aperture and pressing said flange against said solder layer and heating until said solder layer flows.

6. The method of sealing a flanged metal conductor through an apertured ceramic member comprising the steps of silk-screening a uniform layer of refractory metalizing material selected from the group consisting of Mo, W, Mo-Mn, Mo-Cu, and $MoO_3$ onto the surface of said ceramic only in a planar ring-like area around said aperture, the inside dimension of said area being larger than the diameter of said aperture, sintering said layer, silk-screening a uniform layer of nickel onto said sintered layer, silk-screening a uniform layer of hard solder onto said nickel over said area, disposing said conductor through said aperture and pressing said flange against said solder layer and heating until said solder layer flows.

References Cited in the file of this patent

UNITED STATES PATENTS

| | | |
|---|---|---|
| 2,139,431 | Vatter | Dec. 6, 1938 |
| 2,461,878 | Christensen et al. | Feb. 15, 1949 |
| 2,462,020 | Craig | Feb. 15, 1949 |
| 2,520,663 | Tromp | Aug. 29, 1950 |
| 2,611,040 | Brunnetti | Sept. 16, 1952 |
| 2,722,496 | Hosmer | Nov. 1, 1955 |
| 2,739,375 | Coxe | Mar. 27, 1956 |
| 2,770,669 | Smith | Nov. 13, 1956 |
| 2,776,472 | Mesick | Jan. 8, 1957 |
| 2,800,710 | Dunn | July 30, 1957 |
| 2,808,448 | Blevze et al. | Oct. 1, 1957 |
| 2,906,006 | Neel | Sept. 29, 1959 |